(12) United States Patent
Comstock, II (10) Patent No.: US 7,697,137 B2
(45) Date of Patent: Apr. 13, 2010

(54) MONOLITHIC OFFNER SPECTROMETER

(75) Inventor: Lovell E Comstock, II, Charlestown, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/729,300

(22) Filed: Mar. 28, 2007

(65) Prior Publication Data
US 2007/0252989 A1 Nov. 1, 2007

Related U.S. Application Data

(60) Provisional application No. 60/795,916, filed on Apr. 28, 2006, provisional application No. 60/795,917, filed on Apr. 28, 2006.

(51) Int. Cl.
*G01J 3/28* (2006.01)

(52) U.S. Cl. .................. 356/328; 359/566; 359/571

(58) Field of Classification Search ............... 356/328; 359/566–576, 570–571
See application file for complete search history.

(56) References Cited

U.S. PATENT DOCUMENTS

| 5,638,212 A | 6/1997 | Meyers et al. ............ 359/569 |
| 5,754,290 A * | 5/1998 | Rajic et al. ............... 356/328 |
| 5,880,834 A | 3/1999 | Chrisp .................... 356/328 |
| 6,181,418 B1 | 1/2001 | Palumbo et al. .......... 356/328 |
| 6,597,510 B2 | 7/2003 | Bunkenburg et al. ..... 359/620 |
| 6,813,018 B2 | 11/2004 | Richman ................. 356/328 |
| 2003/0197862 A1 * | 10/2003 | Cohen et al. ............. 356/328 |
| 2004/0032659 A1 * | 2/2004 | Drinkwater ............... 359/558 |
| 2005/0068540 A1 * | 3/2005 | De Groot et al. ......... 356/512 |
| 2005/0073680 A1 * | 4/2005 | Chrisp et al. ............. 356/328 |
| 2006/0139636 A1 * | 6/2006 | Kerstan et al. ........... 356/328 |
| 2006/0238756 A1 * | 10/2006 | Bearman et al. .......... 356/318 |

FOREIGN PATENT DOCUMENTS

| JP | 57037223 | 3/1982 |
| WO | 97/02475 | 1/1997 |

* cited by examiner

*Primary Examiner*—Tarifur Chowdhury
*Assistant Examiner*—Abdullahi Nur
(74) *Attorney, Agent, or Firm*—Timothy M Schaeberle (57) ABSTRACT

A monolithic Offner spectrometer is described herein as are various components like a diffraction grating and a slit all of which are manufactured by using a state-of-the-art diamond machining process. In one embodiment, a monolithic Offner spectrometer is directly manufactured by using a diamond machining process. In another embodiment, a monolithic Offner spectrometer is manufactured by using molds which are made by a diamond machining process. In yet another embodiment, a diffraction grating is directly manufactured by using a diamond machining process. In still yet another embodiment, a diffraction grating is manufactured by using a mold which is made by a diamond machining process. In yet another embodiment, a slit is directly manufactured by using a diamond machining process.

21 Claims, 7 Drawing Sheets

MONOLITHIC OFFNER SPECTROMETER

CLAIMING BENEFIT OF PROVISIONAL APPLICATION

This application claims the benefit of U.S. Provisional Application Ser. No. 60/795,916 filed on Apr. 28, 2006 and U.S. Provisional Application Ser. No. 60/795,917 filed on Apr. 28, 2006, the contents of which are incorporated by reference herein.

BACKGROUND OF THE INVENTION

1. Field of the Invention

The present invention relates to the hyper-spectral imaging field and, in particular, to a monolithic Offner spectrometer and various components like a diffraction grating and a slit all of which are manufactured by using a state-of-the-art diamond machining process.

2. Description of Related Art

A spectrometer is a device which receives a light signal as an input and produces as an output a light signal which is spread out, or dispersed, in space according the different wavelength components, or colors, of the input light signal. A detector attached to the spectrometer can analyze the output signal, called the spectrum, to quantify the amount of each wavelength component that is present in the input signal.

A specific type of spectrometer is known as an Offner spectrometer which can be used to produce images of a remote object over a contiguous range of narrow spectral bands. This type of imaging is known as hyper-spectral imaging and has recently emerged as an important part of the military/aerospace solution to airborne and spaceborne reconnaissance and remote sensing. Basically, the hyper-spectral imaging system utilizes an Offner spectrometer and an advanced data processing technology to produce imagery with embedded spectral signature data. This signature data is useful in a wide-variety of applications such as target designation/recognition, missile plume identification and mine detection (for example).

In addition, the hyper-spectral imaging system can be used in a wide-variety of commercial applications as well like cancer detection, environmental monitoring, agricultural monitoring and mineral exploration (for example). Because, the hyper-spectral imaging system is important to military, aerospace, and commercial industries, manufacturers are actively trying to develop new and better ways to make and improve the performance of the Offner spectrometer and associated components like a slit and a diffraction grating. Several new manufacturing processes and the resulting manufactured Offner spectrometer and associated components like the slit and the diffraction grating are the subject of the present invention.

BRIEF DESCRIPTION OF THE INVENTION

A monolithic Offner spectrometer is described herein as are various components like a diffraction grating and a slit all of which are manufactured by using a state-of-the-art diamond machining process. In one embodiment, a monolithic Offner spectrometer is directly manufactured by using a diamond machining process. In another embodiment, a monolithic Offner spectrometer is manufactured by using molds which are made by a diamond machining process. In yet another embodiment, a diffraction grating is directly manufactured by using a diamond machining process. In still yet another embodiment, a diffraction grating is manufactured by using a mold which is made by a diamond machining process. In yet another embodiment, a slit is directly manufactured by using a diamond machining process.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
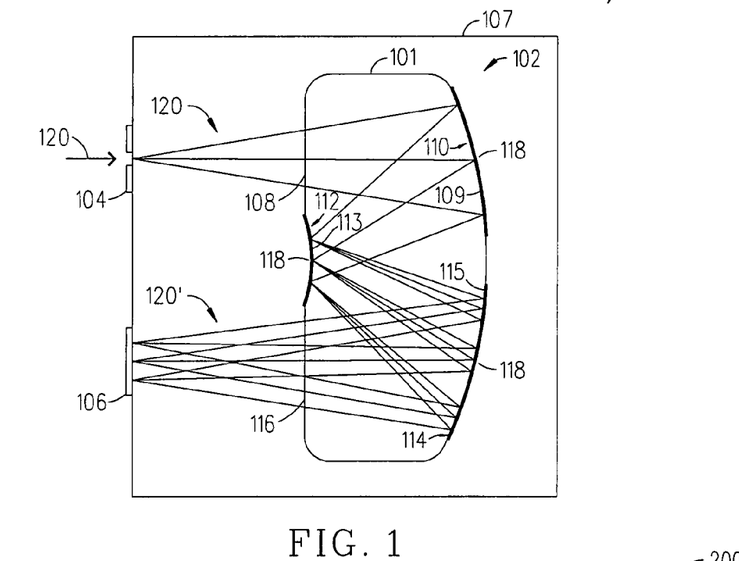
FIG. 1 is a block diagram that illustrates a hyper-spectral imaging system which incorporates a monolithic Offner spectrometer that is configured in accordance with the present invention.

Referring to FIG. 1, there is a block diagram that illustrates a hyper-spectral imaging system 100 which incorporates a monolithic Offner spectrometer 102 that is configured and manufactured in accordance with the present invention. The hyper-spectral imaging system 100 has a slit 104 and a detector 106 both of which are attached to an optical housing 107 (could be made from the same material as the slit 104) which protects the monolithic Offner spectrometer 102. As shown, the monolithic Offner spectrometer 102 is an one-one optical relay made from a single piece of transmissive material 101 including an entrance surface 108, a first mirror 110 (formed when an reflective coating 118 is applied to an exposed portion 109/first surface 109 of transmissive material 101), a diffraction grating 112 (formed when an reflective coating 118 is applied to an exposed portion 113/second surface 113 of transmissive material 101), a second mirror 114 (formed when an reflective coating 118 is applied to an exposed portion 115/third surface 115 of transmissive material 101) and an exit surface 116. The monolithic Offner spectrometer 102 could be manufactured by using one of the two methods 200 and 300 discussed below with respect to FIGS. 2 and 3.

The hyper-spectral imaging system 100 operates to produce images of a remote object (not shown) over a contiguous range of narrow spectral bands when the slit 104 receives a beam 120 from the remote object and directs the beam 120 to the monolithic Offner spectrometer 102 which diffracts the beam 120 and forwards the diffracted beam 120' to the detector 106. In particular, the slit 104 directs the beam 120 to the diamond machined flat entrance surface 108. And, the first mirror 110 (spherical mirror 110) receives the beam 120 which entered the entrance surface 108 and reflects the beam 120 towards the diffraction grating 112 (same shape as the diffraction grating shown in FIGS. 5-8). The diffraction grating 122 receives the beam 120 and diffracts and reflects the diffracted beam 120' to the second mirror 114 (spherical mirror 114). The second mirror 114 receives the diffracted beam 120' and reflects the diffracted beam 120' to the diamond machined exit surface 116. The detector 106 (e.g., two dimensional focal plane array 106 (FPA 106)) receives and process the diffracted beam 120' which passed through the exit surface 116. The particular type of detector 106 used would have a wavelength (color) sensitivity based on the type of transmissive material 101 used to make the monolithic Offner spectrometer 102. For instance, if the monolithic Offner spectrometer 102 was made from a plastic (e.g., polymethylmethacrylate (PMMA), polystyrene, polycarbonate) then the wavelength would be visible and the detector 106 could be a complementary metal-oxide-semiconductor (CMOS) video camera 106. If the monolithic Offner spectrometer 102 was made from an infrared transmitting material, then the detector 106 would have to be an IR detector which could be based on mercury cadmium telluride (HgCdTe) or indium antimonite (InSb).

The monolithic Offner spectrometer 102 described above has several desirable features and advantages some of which are discussed next:

- The monolithic Offner spectrometer 102 is lightweight when compared to traditional open-air Offner spectrometers (which are constructed with individual components).
- The monolithic Offner spectrometer 102 is easy to athermalize which is a desirable property in spaceborne/airborne applications.
- The monolithic Offner spectrometer 102 has a relatively small footprint which makes it not only cost effective but also attractive to medical, analytical, head-up display (HUD), night vision and helment mounted display (HMD) applications (for example).
- The monolithic Offner spectrometer 102 if desired could have conical and aspherical contours formed therein.
- The diffraction grating 112 has a greater dispersion/separation of wavelength (colors) when compared to an open-aired diffraction grating which has the same grating period (groove spacing).

Figure 2:
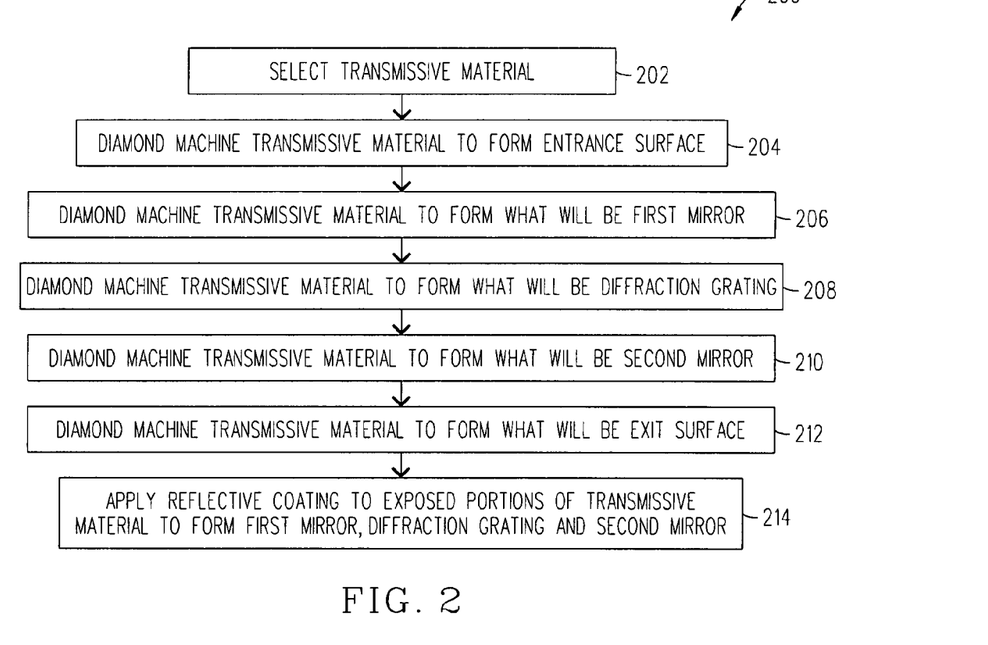
FIG. 2 is a flowchart that illustrates the steps of a preferred method for manufacturing a directly machined monolithic Offner spectrometer in accordance with the present invention.

Referring to FIG. 2, there is a flowchart that illustrates the steps of a preferred method 200 for manufacturing a directly machined monolithic Offner spectrometer 102 in accordance with the present invention. At step 202, the transmissive material 101 which is used to form the monolithic Offner spectrometer 102 needs to be selected. The monolithic Offner spectrometer 102 could be made from any type of diamond machinable transmissive (refractive optical) material such as PMMA, polystyrene, polycarbonate, silicon, germanium, zinc selinide, zinc sulfide (for example). But, there are some factors that can play a role in what type of transmissive material 101 should be selected and these factors include the spectral area of interest for the particular application and the index of refraction of the transmissive material 101.

Once, the transmissive material 101 is selected it is mounted and secured onto a computer numerical control (CNC) diamond turning machine such that a diamond tool can be used to form the monolithic Offner spectrometer 102. At step 204, the diamond tool is used to diamond machine the transmissive material 101 so as to form the entrance surface 116. At step 206, the diamond tool is used to diamond machine the transmissive material 101 so as to form what will become the first mirror 110. At step 208, the diamond tool is used to diamond machine the transmissive material 101 so as to form what will become the diffraction grating 112 (same shape as the diffraction grating shown in FIGS. 5-8). At step 210, the diamond tool is used to diamond machine the transmissive material 101 so as to form what will become the second mirror 114. At step 212, the diamond tool is used to diamond machine the transmissive material 101 so as to form the exit surface 116. Once the diamond machining steps 204, 206 . . . 212 are completed, then at step 214, a reflective coating 118 (back surface coating 118) is applied to the relevant exposed portions of the diamond machined transmissive material 101 to form the first mirror 110, the diffraction grating 112 and the second mirror 114. For instance, the reflective coatings 118 could be applied by using anyone of the vacuum techniques which are commonly used in the optical industry. At this point, a direct machined monolithic Offner spectrometer 102 has been manufactured (see FIG. 1).

Figure 3:
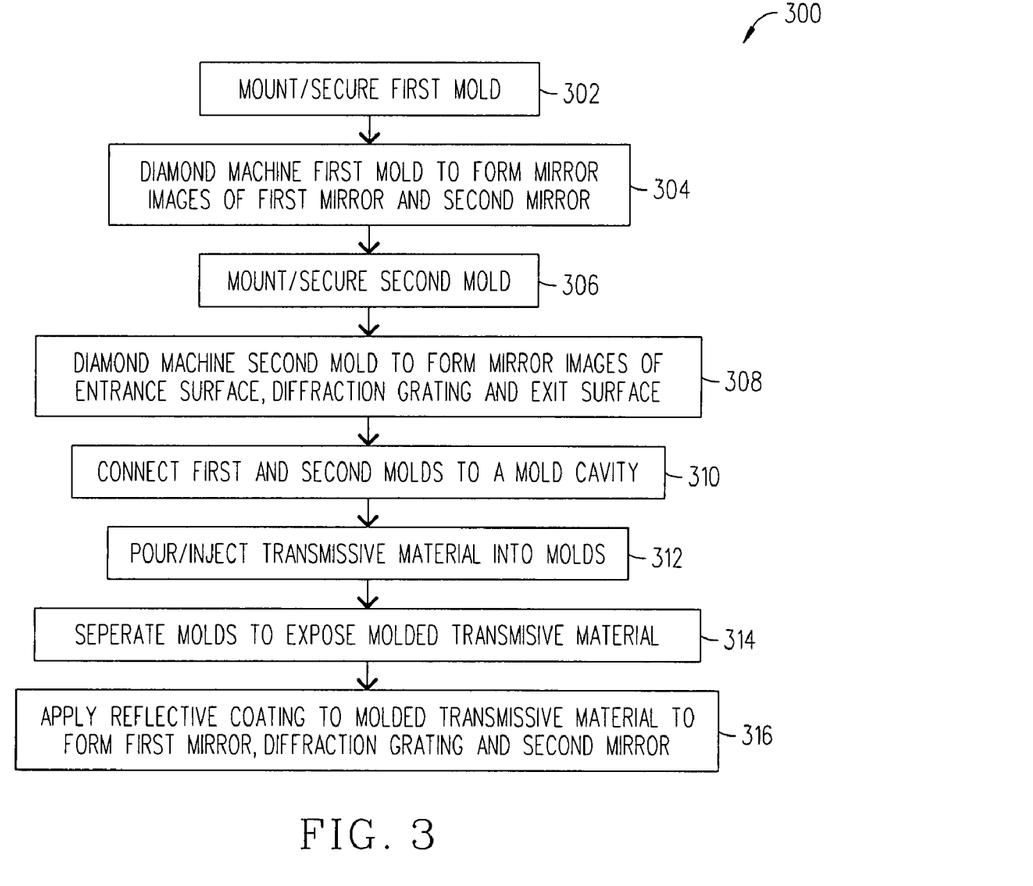
FIG. 3 is a flowchart that illustrates the steps of a preferred method for manufacturing a molded monolithic Offner spectrometer in accordance with the present invention.
Figure 4:
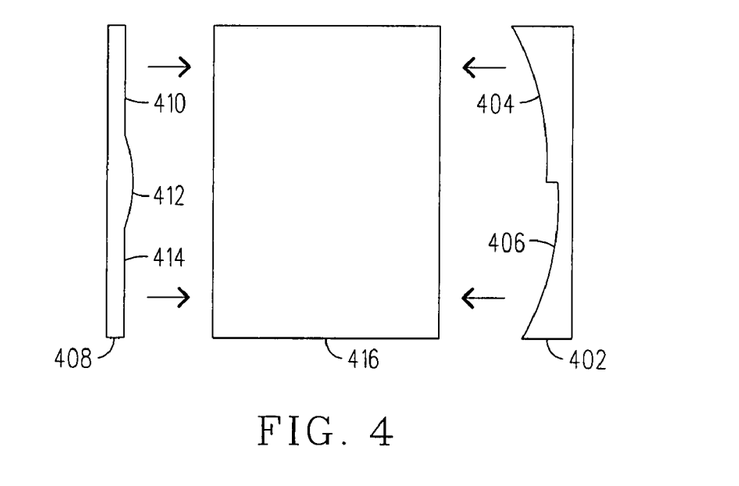
FIG. 4 is a block diagram that illustrates three molds which can be used to make a molded monolithic Offner spectrometer using the method shown in FIG. 3 in accordance with the present invention.

Referring to FIG. 3, there is a flowchart that illustrates the steps of a preferred method 300 for manufacturing a molded monolithic Offner spectrometer 102 in accordance with the present invention. At step 302, a first mold 402 (which could be made from nickel) is mounted and secured onto a CNC diamond turning machine. A diamond tool is then used to diamond machine the first mold 402 so as to form therein mirror images 404 and 406 which are respectively associated with what are to become the first and second mirrors 110 and 114 (step 304). FIG. 4 is a diagram that illustrates an exemplary first mold 402 which has formed therein the mirror images 404 and 406 that are respectively associated with what are to become the first and second mirrors 110 and 114.

At step 306, a second mold 408 (which could be made from nickel) is mounted and secured onto the CNC diamond turning machine. A diamond tool is then used to diamond machine the second mold 408 so as to form therein mirror images 410, 412 and 414 which are respectively associated with what are to become the entrance surface 108, the diffraction grating 112 (same shape as the diffraction grating shown in FIGS. 5-8) and the exit surface 114 (step 308). FIG. 4 is a diagram that illustrates an exemplary second mold 408 which has formed therein the mirror images 410, 412 and 414 that are respectively associated with what are to become the entrance surface 108, the diffraction grating 112 and the exit surface 114.

At step 310, the first mold 402 and the second mold 408 are each connected/attached to opposite ends of a mold cavity 416 (see FIG. 4). At step 312, a transmissive material 101 is poured/injected into a cavity formed within the first mold 402, the second mold 408 and the mold cavity 416. For instance, the step 312 could be part of an injection molding process, a compression molding process or a casting process. The transmissive material 101 can be any type of refractive optical material such as PMMA, polystyrene, polycarbonate (for example). But, there are some factors that can play a role in what type of transmissive material 101 should be used and these factors include the spectral area of interest for the particular application and the index of refraction of the transmissive material 101.

At step 314, the first mold 402, the second mold 408 and the mold cavity 416 are separated from one another to expose the molded transmissive material 101. At step 316, a reflective coating 118 (back surface coating 118) is applied to the exposed back portions on the molded transmissive material 101 to form the first mirror 110, the diffraction grating 112 and the second mirror 114. Again, the reflective coatings 118 could be applied by using anyone of the vacuum techniques which are commonly used in the optical industry. At this point, a molded monolithic Offner spectrometer 102 has been manufactured (see FIG. 1).

Figure 5:
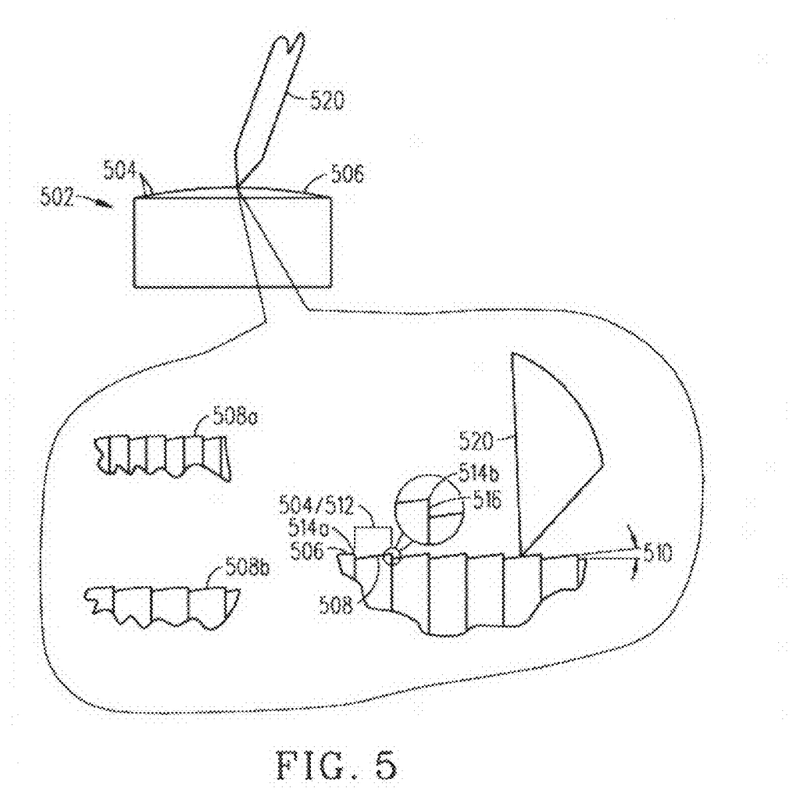
FIG. 5 is a block diagram that illustrates a diffraction grating which is configured in accordance with the present invention.

Referring to FIG. 5, there is a block diagram of a stand-alone diffraction grating 502 which is configured in accordance with the present invention (the stand-alone diffraction grating 502 has similar features but is not the same as the diffraction grating 112 discussed above in FIG. 1). As shown, the diffraction grating 502 has a large number of linear gratings 504 which are formed within a powered surface 506 (e.g., sphere surface 506, toroid surface 506). Each linear grating 504 has a blazed surface 508 (or a dual facet blaze surface 508a or powered blazed surface 508b) which is tilted according to a blaze angle 510 that varies across the powered surface 506. And, each linear grating 504 has a period 512 which is defined by the distance between two ruled lines 514a and 514b. Each ruled line 514a and 514b has what is referred to herein as a blaze reset 516. A discussion about how the diffraction grating 502 can be manufactured is provided next with respect to FIG. 6.

Figures 6, 7A:
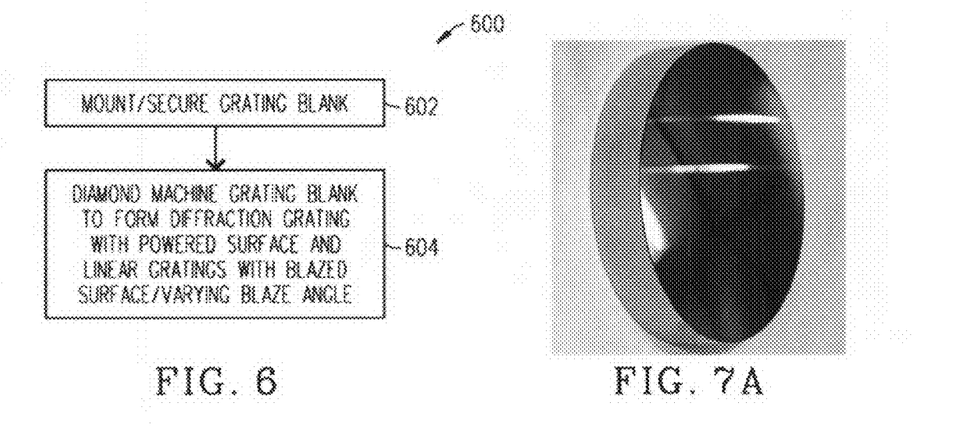
FIG. 6 is a flowchart that illustrates the steps of a preferred method for manufacturing a directly machined diffraction grating in accordance with the present invention.
FIGS. 7A-7B illustrate a photo and two profile measurements associated with an exemplary diffraction grating which was manufactured in accordance with the present invention.

Referring to FIG. 6, there is a flowchart that illustrates the steps of a preferred method 600 for manufacturing the diffraction grating 502 in accordance with the present invention. At step 602, a grating blank 502' (future diffraction grating 502) is mounted and secured onto a CNC diamond turning machine. In one embodiment, the grating blank 502' is mounted 90 degrees to the spindle axis of the CNC diamond turning machine. As such, in one plane the grating blank 502' exhibits a circular cross section. In the other plane, the grating blank 502' exhibits a side which is diamond machined in accordance with a CNC program so as to form the predetermined diffraction grating 502.

Figure 7B:
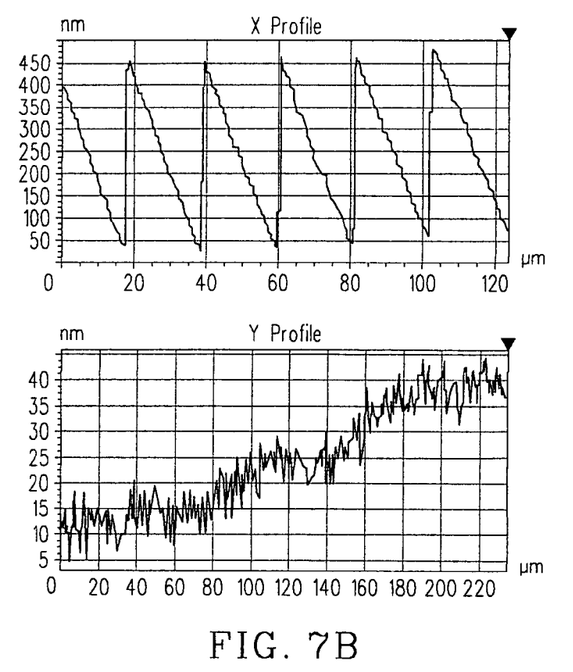

At step 602, the CNC program controls the operation and movement of the diamond tool 520 (which preferably has a radius that is smaller than the blaze reset 516) through a path defined by the grating profile so as to form the linear gratings 504 on the powered surface 506 (curved surface 506). The variation in the blaze angle 510 along the powered surface 506 is also controlled by the CNC program. This process can be used to form grating periods 512 which range from a few microns to a few millimeters. FIGS. 7A and 7B respectively illustrate a photo and two profile measurements associated with an exemplary diffraction grating 502 which was manufactured in accordance with the present invention.

Figure 8:
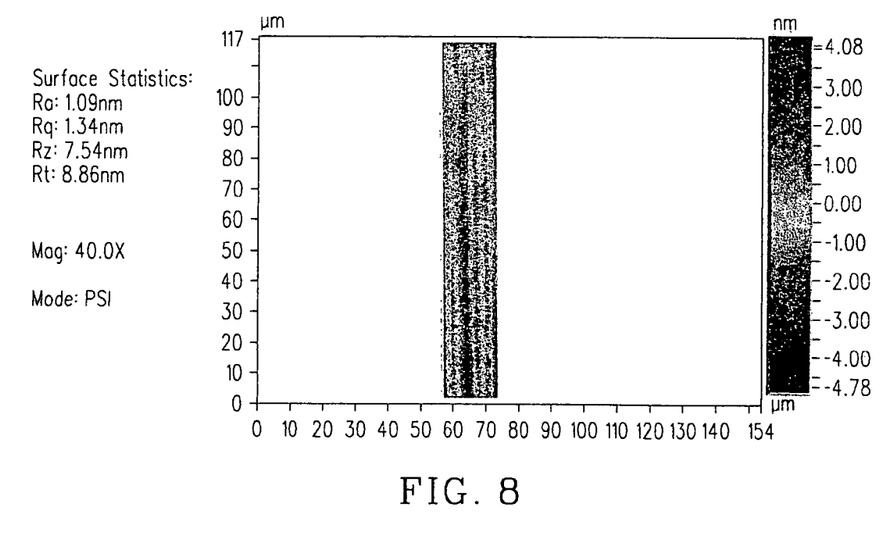
FIG. 8 is a graph that shows the characteristic nature of the roughness of repetitive features on a blazed surface of a linear grating within a diffraction grating which was manufactured in accordance with the present invention.
Figure 9A:
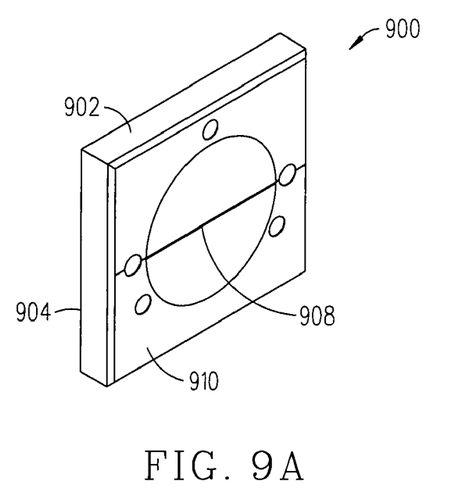
FIGS. 9A-9D are various diagrams that illustrate a slit which is configured in accordance with the present invention.
Figure 9B:
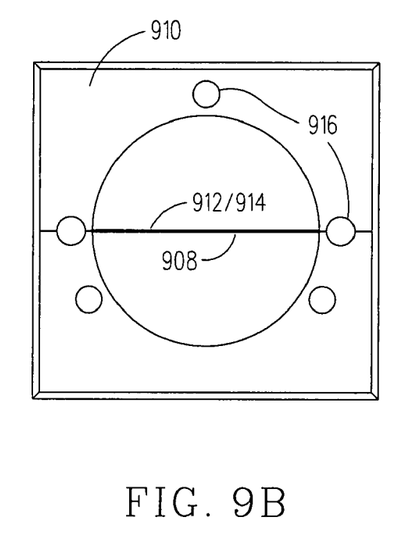
Figure 9C:
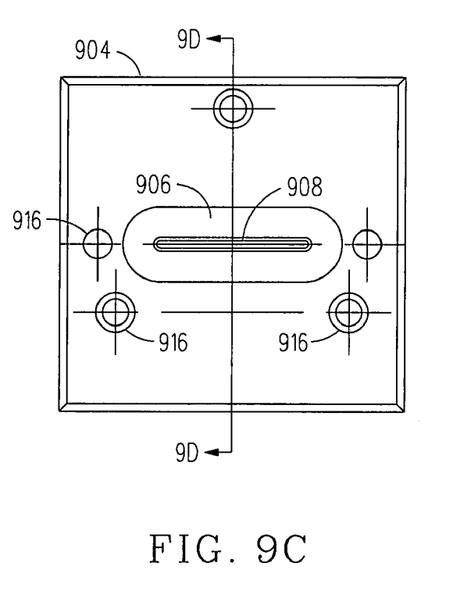
Figure 9D:
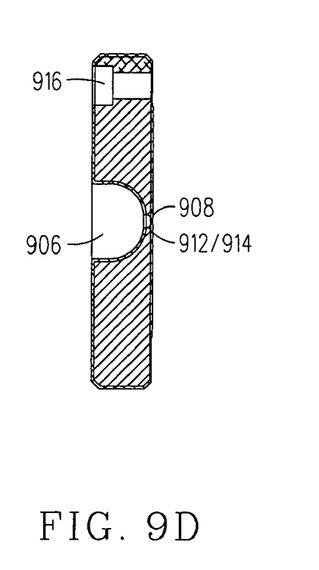

In the preferred embodiment, the diamond tool 520 has a tip with a radius in the range of 0.5 microns to 20 microns. Because, the diamond tool's tip radius is very small, the CNC diamond turning machine needs to have a very slow feed-rate to obtain the desired optical finish. Plus, the CNC diamond turning machine needs to operate at feedback resolutions of less than 10 nm. This type of manufacturing process can take a long time and as a result the uniformity of the grating period 512 may become sensitive to the thermal stability of the CNC diamond turning machine. To address this concern, one could machine the blaze surface 508/blaze angle 510 first and then machine the blaze resets 516 (which define the period 512) using a separate more time efficient CNC program. If this is done, then the diffraction grating 512 is going to have a surface finish which has a characteristic "fingerprint". FIG. 8 is a graph that illustrates the repetitive structure of an exemplary characteristic "fingerprint" as seen by an optical profiler on one of the blaze surfaces 508. This particular characteristic "fingerprint" had a roughness (Ra) of ~1 nm. The repetitive structure of this characteristic "fingerprint" is one way that could be used to determine if a diffraction grating happened to be manufactured in accordance with the present invention.

The manufacturing method 600 and the manufactured diffraction grating 512 described above have several desirable features and advantages, some of which are discussed next:

The manufacturing method 600 can be used to produce either convex or concave surfaces which means that molds for replicating multiple diffraction gratings 502 can be produced (e.g., see FIG. 4). This is desirable because a molded diffraction grating 502 can be produced cost effectively and at the high volumes necessary for commercial applications.

The manufacturing method 600 could be used to manufacture a diffraction grating 112 like the one that is part of the monolithic Offner spectrometer 102 discussed above with respect to FIGS. 1-4. In this case, the diffraction grating 112 would have the following features: (1) linear gratings 504; (2) powered surface 506; (3) blaze surface 508 (dual facet blaze surface 508a, powered blazed surface 508b); (4) blaze angle 510 (varying blaze angle 510); and (5) blaze reset 516.

The diffraction grating 502 is mechanically and environmentally stable because it's profile is machined directly into a metal (e.g., nickel, copper, aluminum) or a glass-like material (e.g., germanium, silicon, $CaF_2$).

The diffraction grating 502 can have mounting and alignment features (e.g., threaded holes) machined therein as well during the manufacturing process.

The CNC program and small diamond tool 520 work together to ensure that the variation in the blaze angle 510 is machined to match the particular angle of incidence of the light at particular points on the powered surface 506. This variation in the blaze angle 510 improves the efficiency. In addition, this variation in the blaze angle 510 is an additional degree of design freedom that could not be exploited in the past.

The blaze surface 508 does not have to be a flat surface with a blaze angle 510 that is optimized for one wavelength. Instead, the blaze surface 508 can be faceted, or "powered" to optimize performance over an extended operational wavelength range. FIG. 5 illustrates an exemplary dual facet blaze surface 508a and an exemplary powered blaze surface 508b.

A designer can control the manufacturing process to vary the period 512 in order to correct an optical aberration. Or, the designer can vary the period 512 so they can use multiple apertures with different periods on a common substrate.

The blaze reset 516 between two blaze surfaces 508 can have an angle that varies similar to the variation in the blaze angle 510. However, this is not a requirement with the present invention. The small diamond tool 520 enables one to use the same point on the tool 520 so they have the ability to vary the angle of the blaze reset 516 at a different angle than the blaze angle 510 associated with the blaze surfaces 508.

This manufacturing process has been demonstrated to be viable for nickel plating, copper plating, crystalline materials (e.g., germanium, silicon, etc) as well as an aluminum alloy (e.g., Corning NetOptix's LLC aluminum alloy). The aluminum alloy is of particular interest because many military applications happen to have aluminum mounting structures and also have wide operating temperatures. Thus, the ability to make a diffraction grating 502 from an aluminum alloy is beneficial since it will not deform as much as if it was made from a bi-metallic (coated) substrate.

Referring to FIGS. 9A-9D, there are various diagrams that illustrate a slit 900 which is configured in accordance with the present invention. In practice, the slit 900 would be placed in front of an entrance surface of a spectrometer For example, the slit 900 could be placed in front of the entrance surface 108 of the monolithic Offner spectrometer 102 shown in FIG. 1. It should be noted that the main function of most spectrometers (including the monolithic Offner spectrometer 102) is to split an image of a line into a 2D image spectrally such that one dimension is spatial and the other dimension is spectral. And, the main function of the slit 900 is to act as a field stop and only accept a single line image (which is typically a little wider than an individual detector element).

The slit 900 shown can be made from a diamond machinable substrate 902 (e.g., cooper, nickel, aluminum, silicon, germanium, gold, calcium fluoride) having a first side 904 which has a portion 906 removed therefrom by a diamond ball nose milling process (see step 1002 in FIG. 10) to define the length of a slit aperture 908. The diamond machinable substrate 902 also has a second side 910 which has a portion 912 removed therefrom by a diamond fly-cutting process (see step 1004 in FIG. 10) to form a groove 914 which breaks through to the first side 904 to form the slit aperture 908. Lastly, the diamond machinable substrate 902 can have precision mounting features 916 formed therein (see step 1006 in FIG. 10). A detailed discussion about how slit 900 could be manufactured is provided next with respect to FIGS. 11 and 12.

Figure 10:
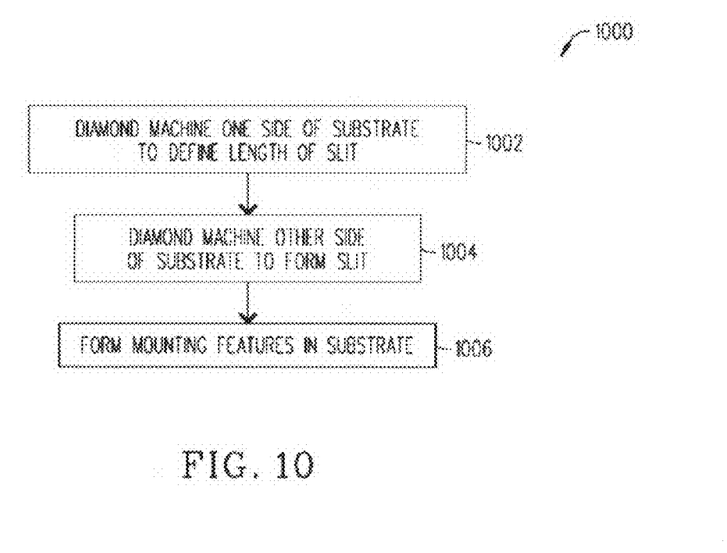
FIG. 10 is a flowchart that illustrates the steps of a preferred method for manufacturing a slit in accordance with the present invention.
Figure 11A:
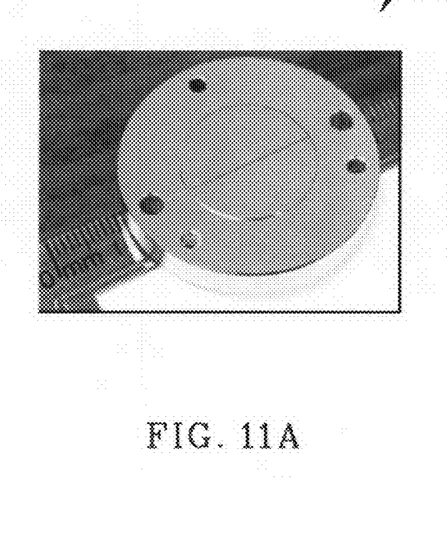
FIGS. 11A-11B are two photos of an exemplary slit that was manufactured using the method shown in FIG. 10 in accordance with the present invention.
Figure 11B:
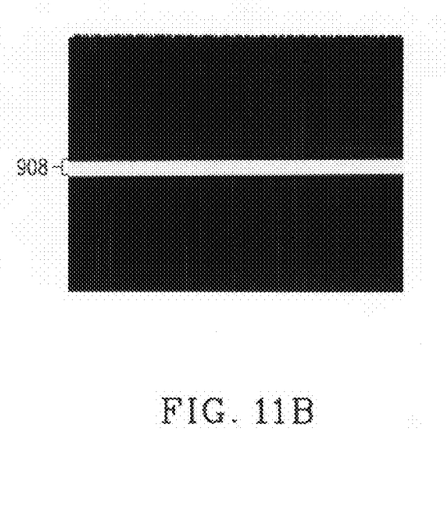

Referring to FIGS. 11A-11B, there are two photos of an exemplary slit 900 which was manufactured in accordance with the present invention. This particular slit 900 was manufactured by taking a stress relieved aluminum blank 902 and plating it with ~0.015" of electroless nickel (element 902 identified in FIGS. 9A-9D). The nickel was used because it has significantly less ductility than aluminum and produces a much better quality slit 908 than could be obtained when only aluminum is used. The faces of this part 902 were then diamond flycut on a diamond machining lathe to remove ~0.005" from each side to maintain precise paralellism. A diamond tool 1202 (see FIG. 12A) which had a single flute ball nose end was mounted in a 3 axis diamond machining system (similar to a 3 axis milling machine, but with higher accuracies, air bearings, etc.). The diamond tool 1202 was used to machine a cylindrical trough 906, the length of the slit 908, through the nickel, aluminum, and ~0.005" into the nickel layer on the second side 910 of the part 902 (see step 1002 in FIG. 10)(elements 906, 908 and 910 identified in FIGS. 9A-9D). At this point, there was ~0.005" thick "skin" of nickel left in the slit area. The part 902 was then mounted on a different diamond turning machine known as a 3 axis flycutter. A diamond tool 1204 (see FIG. 12B) was mounted on the outer diameter of the flycutter's head with it's sharp "tip" pointing radially out from the flycutter's axis of rotation. The diamond tool 1204 had a geometry which was defined by the optical F# at which the slit 900 needs to perform at, as well as by the width of the slit aperture 908. The part 902 was then fixtured so that a V groove 914 was cut through the second side 910 forming the final slit 908 (elements 902, 908, 910 and 914 identified in FIGS. 9A-9D). FIG. 11B is a 400× image of a 30 um wide slit 908 which shows the quality that can be produced by this manufacturing method 1000.

The manufacturing method 1000 and the manufactured slit 900 described above have several desirable features and advantages some of which are discussed next:

The slit 900 can be manufactured out of the same material as the optical housing (which houses the Offner spectrometer or other spectrometer). This is desirable since it would enhance the thermal performance and structural robustness of the imaging system. For example, two known manufacturing methods for slits utilize substrates made from chrome/glass and copper electroforming. Neither of these materials have a good thermal match to an aluminum housing.

Figure 12A:
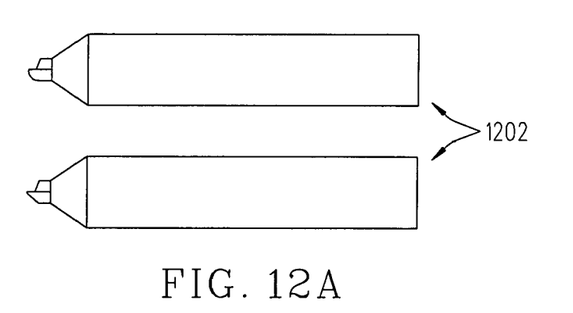
FIGS. 12A-12B are two diagrams that illustrate two types of diamond tools which were used to manufacture the exemplary slit shown in FIGS. 11A-11B in accordance with the present invention.
Figure 12B:
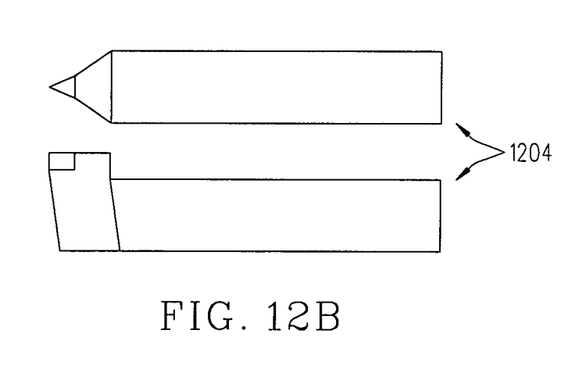

The diamond tools 1202 and 1204 can have anyone of a variety of geometries such as radius, flat, pointed, etc. . . .

The manufacturing method 1000 allows for the formation of precision mounting features 916 within the slit 900 which are used to position and orientate the slit 900 in the final assembly. Most imaging systems require precise alignment between the slit 900 and the diffraction grating 112 and 502 (see FIGS. 1 and 5) and hence significant advantages can be realized by forming these mounting features 916 when the slit 900 is manufactured.

Figure 13A:
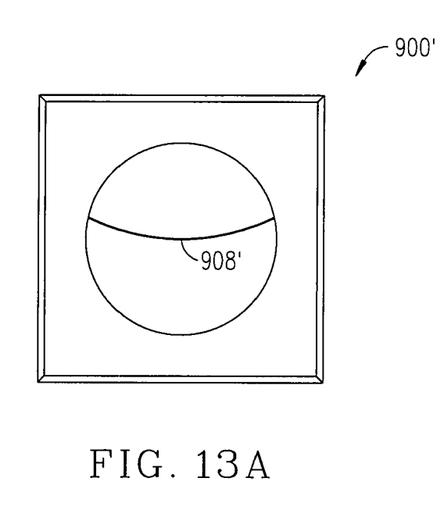
FIGS. 13A-13B are two diagrams that respectively illustrate a slit with a curved slit aperture and a slit with multiple slit apertures in accordance with the present invention.
Figure 13B:
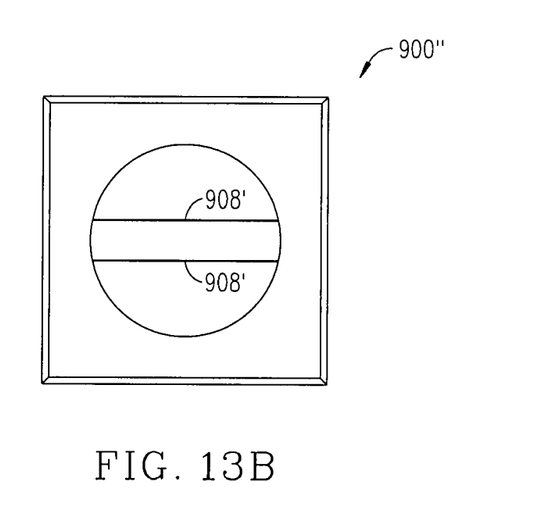

Referring to FIGS. 13A-13B, there are two diagrams that respectively illustrate a slit 900' with a curved slit aperture 908' and a slit 900' with multiple slit apertures 908" in accordance with the present invention. To make slit 900', the diamond machining step 1004 of method 1000 would be performed by mounting the substrate 902 off-axis on the diamond turning lathe. If this is done, then the curved slit aperture 908' could be produced. The curved slit 900' may be beneficial in an Offner spectrometer and a Dyson spectrometer because the best optical performance is obtained over a curved line that is symmetric with the axis of the spectrometer. This is typically not used since the detector usually has straight rows of pixels. But, for certain applications it may be desirable to use the curved slit 900'. And, to make slit 900", the diamond machining steps 1002 and 1004 of method 1000 could be repeated more than once on the substrate 902. This slit 900" could be used in a 3D hyper-spectral imaging system.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A hyper-spectral imaging system, comprising:
   a housing;
   a slit attached to said housing;
   a detector attached to said housing; and
   a monolithic Offner spectrometer positioned inside said housing, wherein said monolithic Offner spectrometer includes:
      a transmissive material which has:
         an entrance surface;
         a first surface which has a first reflective coating applied thereto to form a first mirror for receiving and reflecting a beam that passed through said entrance surface;

a second surface which has a second reflective coating applied thereto to form a diffraction grating for receiving, diffracting and reflecting the beam, wherein said diffraction grating has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle;

a third surface which has a third reflective coating applied thereto to form a second mirror for receiving and reflecting the diffracted beam; and an exit surface for passing there through the diffracted beam reflected from said second mirror.

2. The hyper-spectral imaging system of claim 1, wherein said housing and said slit are both made from the same material.

3. A hyper-spectral imaging system, comprising:
a housing;
a slit attached to said housing, wherein said slit includes:
  a substrate having a first side which had a portion removed by a diamond ball nose milling process to define a length of a slit aperture; and
  said substrate having a second side which had a portion removed by a diamond fly-cutting process to cut a groove which broke through to said first side to form the slit aperture;
a detector attached to said housing; and
a monolithic Offner spectrometer positioned inside said housing, wherein said monolithic Offner spectrometer includes:
  a transmissive material which has:
    an entrance surface;
    a first surface which has a first reflective coating applied thereto to form a first mirror for receiving and reflecting a beam that passed through said entrance surface;
    a second surface which has a second reflective coating applied thereto to form a diffraction grating for receiving, diffracting and reflecting the beam, wherein said diffraction grating has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle;
    a third surface which has a third reflective coating applied thereto to form a second mirror for receiving and reflecting the diffracted beam; and
    an exit surface for passing there through the diffracted beam reflected from said second mirror.

4. A monolithic Offner spectrometer, comprising:
a transmissive material which has:
  an entrance surface;
  a first surface which has a first reflective coating applied thereto to form a first mirror for receiving and reflecting a beam that passed through said entrance surface;
  a second surface which has a second reflective coating applied thereto to form a diffraction grating for receiving, diffracting and reflecting the beam, wherein said diffraction grating has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle;
  a third surface which has a third reflective coating applied thereto to form a second mirror for receiving and reflecting the diffracted beam; and an exit surface for passing there through the diffracted beam reflected from said second mirror.

5. The monolithic Offner spectrometer of claim 4, wherein said transmissive material is molded within diamond machined molds.

6. The monolithic Offner spectrometer of claim 4, wherein said transmissive material is diamond machined to form therein said entrance surface, said first mirror, said diffraction grating, said second mirror and said exit surface.

7. The monolithic Offner spectrometer of claim 4, wherein said transmissive material is acrylic, polycarbonate or other plastic which is suitable for visible applications.

8. The monolithic Offner spectrometer of claim 4, wherein said transmissive material is germanium, silicon or other material which is suitable for infrared applications.

9. A method for manufacturing a monolithic Offner spectrometer, said method comprising the steps of:
diamond machining a transmissive material to form therein an entrance surface;
diamond machining said transmissive material to form therein a first surface and then applying a first reflective coating thereto to form a first mirror;
diamond machining said transmissive material to form therein a second surface and then applying a second reflective coating thereto to form a diffraction grating, wherein said diffraction grating has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle;
diamond machining said transmissive material to form therein a third surface and then applying a third reflective coating thereto to form a second mirror; and
diamond machining said transmissive material to form therein an exit surface.

10. A method for manufacturing a monolithic Offner spectrometer, said method comprising the steps of:
diamond machining a first mold to form therein mirror images of a first mirror and a second mirror;
diamond machining a second mold to form therein mirror images of an entrance surface, a diffraction grating and an exit surface;
attaching said first mold and said second mold onto opposite ends of a mold cavity;
filling said first mold, said second mold and said mold cavity with a transmissive material;
removing said first mold, said second mold and said mold cavity to expose the transmissive material; and
applying a reflective coating to an exposed surface of said transmissive material to form therein said first mirror, said diffraction grating and said second mirror, wherein said diffraction grating has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle.

11. The method of claim 10, wherein said filling step further includes using one of the following:
an injection molding process;
a compression molding process; or
a casting process.

12. A diffraction grating, comprising: a powered surface which has a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle, wherein said blazed surface has a roughness (Ra) of ~1 nm.

13. The diffraction grating of claim 12, wherein said powered surface has linear gratings which have different sized periods.

14. The diffraction grating of claim 12, wherein said tilted blazed surface is:
a dual facet surface; or
a powered facet surface.

15. The diffraction grating of claim 12, wherein said powered surface is a sphere surface.

16. A method for manufacturing a diffraction grating, said method comprising the steps of:
securing a material to a diamond machine; and
diamond machining the material to form said diffraction grating which has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle.

17. The method of claim 16, wherein said diamond machining step further includes:
diamond machining, at a relatively slow speed, the material to form the blazed surfaces; and
diamond machining, at a relatively fast speed, the material to form resets which define periods of the linear gratings.

18. A method for manufacturing a mold which is used to make a diffraction grating, said method comprising the steps of:
securing a material to a diamond machine; and
diamond machining the material to form said mold which has formed therein a mirror image of said diffraction grating which has a powered surface with a plurality of linear gratings and each linear grating has a blazed surface which is tilted according to a blaze angle that varies across the powered surface, wherein each linear grating has a period defined by a distance between two ruled lines and each ruled line has a blaze reset, and wherein each blaze reset has an angle that varies at a different angle than the varying blaze angle.

19. The method of claim 18, wherein said diamond machining step further includes:
diamond machining, at a relatively slow speed, the mold to form the mirror image of the blazed surfaces; and
diamond machining, at a relatively fast speed, the mold to form the mirror image of resets which define periods of the linear gratings.

20. A diffraction grating, comprising:
a powered surface which has a plurality of linear gratings and each linear grating has a blazed surface which is tilted according to a blaze angle that varies across the powered surface, wherein each linear grating has the blazed surface with the varying blaze angle where the variation in the blaze angle matches a particular angle of incidence of light at particular points on the powered surface, wherein each linear grating has a period defined by a distance between two ruled lines and each ruled line has a blaze reset, and wherein each blaze reset has an angle that varies at a different angle than the varying blaze angle.

21. A diffraction grating, comprising:
a powered surface which has a plurality of linear gratings and each linear grating has a blazed surface which is tilted according to a blaze angle that varies across the powered surface, wherein said powered surface is a toroid surface, wherein each linear grating has a period defined by a distance between two ruled lines and each ruled line has a blaze reset, and wherein each blaze reset has an angle that varies at a different angle than the varying blaze angle.

* * * * *